United States Patent
Hendry et al.

(10) Patent No.: US 8,453,063 B1
(45) Date of Patent: May 28, 2013

(54) DISPLAY MANAGER THAT DYNAMICALLY ADJUSTS FOR DEPENDENCIES IN A VIDEO DISPLAY SYSTEM

(75) Inventors: Ian Hendry, San Jose, CA (US); Eric Anderson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 1058 days.

(21) Appl. No.: 10/835,457

(22) Filed: Apr. 30, 2004

(51) Int. Cl.
*G06F 3/00* (2006.01)
*G06F 3/048* (2006.01)

(52) U.S. Cl.
USPC ........... 715/761; 715/764; 715/771; 715/804; 715/805; 345/1.1; 345/3.4; 345/531; 345/699

(58) Field of Classification Search
USPC ................ 715/747, 761, 771, 804–806, 778, 715/764; 345/1.1, 3.4, 531, 699
See application file for complete search history.

(56) References Cited

U.S. PATENT DOCUMENTS

| | | | | |
|---|---|---|---|---|
| 5,477,241 A * | 12/1995 | Higgins et al. | ................ | 345/661 |
| 5,581,788 A * | 12/1996 | Ballare | ............................ | 710/14 |
| 5,608,864 A * | 3/1997 | Bindlish et al. | ................ | 345/558 |
| 5,654,730 A * | 8/1997 | Tanaka | ............................ | 345/87 |
| 5,682,529 A * | 10/1997 | Hendry et al. | ................. | 713/100 |
| 5,727,155 A * | 3/1998 | Dawson | ......................... | 709/205 |
| 5,825,359 A | 10/1998 | Derby et al. | | |
| 5,923,307 A * | 7/1999 | Hogle, IV | ............................ | 345/4 |
| 6,049,316 A * | 4/2000 | Nolan et al. | .................... | 345/698 |
| 6,154,225 A * | 11/2000 | Kou et al. | ....................... | 345/519 |
| 6,215,459 B1* | 4/2001 | Reddy et al. | .................... | 345/3.1 |
| 6,501,441 B1* | 12/2002 | Ludtke et al. | ................... | 345/1.1 |
| 6,618,026 B1* | 9/2003 | Grigor et al. | ................... | 345/1.1 |
| 6,628,243 B1* | 9/2003 | Lyons et al. | .................... | 345/1.1 |
| 6,697,941 B2* | 2/2004 | Kahler et al. | ................. | 713/100 |
| 6,724,351 B1* | 4/2004 | Boger | ............................. | 345/3.2 |
| 6,744,460 B1* | 6/2004 | Nimri et al. | ................. | 348/14.11 |
| 6,809,737 B1* | 10/2004 | Lee et al. | ........................ | 345/533 |
| 6,917,348 B2* | 7/2005 | Demsky et al. | ................ | 345/1.1 |
| 6,928,543 B2* | 8/2005 | Hendry et al. | ................. | 713/100 |
| 7,079,128 B2* | 7/2006 | Kim | .................................. | 345/213 |
| 7,136,042 B2* | 11/2006 | Magendanz et al. | .......... | 345/100 |
| 7,158,094 B2* | 1/2007 | Wilks | ............................. | 345/1.1 |
| 7,356,823 B2* | 4/2008 | Martyn | ......................... | 719/323 |
| 7,380,116 B2* | 5/2008 | Hendry et al. | ................. | 713/100 |
| 7,598,948 B1* | 10/2009 | Priem | ............................ | 345/204 |
| 2003/0231168 A1* | 12/2003 | Bell et al. | ....................... | 345/173 |
| 2004/0212610 A1* | 10/2004 | Hamlin | ......................... | 345/211 |
| 2005/0073470 A1* | 4/2005 | Nose et al. | ...................... | 345/1.1 |
| 2006/0048062 A1* | 3/2006 | Adamson | ....................... | 715/760 |
| 2006/0132473 A1* | 6/2006 | Fuller et al. | ..................... | 345/204 |
| 2008/0088635 A1* | 4/2008 | Callway et al. | ............... | 345/522 |

\* cited by examiner

*Primary Examiner* — Steven B Theriault
(74) *Attorney, Agent, or Firm* — Fish & Richardson P.C.

(57) ABSTRACT

A display manager determines if a change to one configuration parameter of the display system will affect any of the other configuration parameters of the display system, i.e., whether there is a dependency. If such a dependency exists, the display manager evaluates each of the modes of operation of the display component whose settings will be affected, to identify whether it has any modes that are compatible with the changed configuration of the display system. If so, the display manager selects the configuration mode that is closest to the current mode of the affected component and provides compatibility with the changed configuration. By means of such an approach, the user continues to have access to all components, rather than having to reconfigure and/or restart the computer system due to a change which occurs in the display configuration.

37 Claims, 3 Drawing Sheets

Device 1

|  | Mode1 | | | Mode 2 | | | Mode 3 | | |
|---|---|---|---|---|---|---|---|---|---|
| Resolution | 1024x768 | | | 1920x1200 | | | 640x480 | | |
| Timing | 74.9Hz | | | 75Hz | | | 67Hz | | |
| Max Bit Depth | 8 | 16 | 32 | 8 | 16 | 32 | 8 | 16 | 32 |
| Dependency | 0 | 0 | X | 0 | 1 | 1 | 0 | 0 | 0 |

*Fig. 2*

Device 2

|  | Mode1 | | | Mode 2 | | | Mode 3 | | |
|---|---|---|---|---|---|---|---|---|---|
| Resolution | 1152x870 | | | 1024x768 | | | 832x624 | | |
| Timing | 75Hz | | | 74.9Hz | | | 75Hz | | |
| Max Bit Depth | 8 | 16 | 32 | 8 | 16 | 32 | 8 | 16 | 32 |
| Dependency | 0 | 0 | X | 0 | 0 | 0 | 1 | 1 | 1 |

*Fig. 3*

Device 1

|  | Mode1 | | | Mode 2 | | | Mode 3 | | |
|---|---|---|---|---|---|---|---|---|---|
| Resolution | 1024x768 | | | 1920x1200 | | | 640x480 | | |
| Timing | 74.9Hz | | | 75Hz | | | 67Hz | | |
| Max Bit Depth | 8 | 16 | 32 | 8 | 16 | 32 | 8 | 16 | 32 |
| Dependency | 0 | 0 | 0 | 0 | X | 1 | 0 | 0 | 0 |

*Fig. 4*

DISPLAY MANAGER THAT DYNAMICALLY ADJUSTS FOR DEPENDENCIES IN A VIDEO DISPLAY SYSTEM

FIELD OF THE INVENTION

The present invention is generally directed to video display systems for computers, and more particularly to a display system that dynamically accommodates configuration dependencies when a change is made to one of the configuration parameters of the system.

BACKGROUND OF THE INVENTION

In a number of different types of computing environments, hardware resources are often shared between two or more components of the video display system. One example of such a situation occurs when two display devices, e.g., two monitors or a monitor and a video projector, are connected to a single computer. Both of the display devices may be driven by a single video card within the computer. In such a situation, a number of resources provided by the video card are shared between the two display devices. Such resources include the video memory (e.g. frame buffer), overlay hardware, gamma registers, clocks and data buses. Because the two display devices share resources, their configurations become dependent upon one another. For example, if the video card has a frame buffer with eight megabytes (MB) of storage capacity, the display devices may have their resolutions set so that they each require four MB of memory. If one of the monitors is reset to a higher resolution, it may then require six MB of memory. In such a case, only two MB of the frame buffer are available for the other display device, and therefore it must be reconfigured to accommodate the limited amount of memory available to it. For example, the display resolution can be lowered, or the number of bits that are allocated to each pixel can be reduced.

In the past, it was not possible to effect these types of changes dynamically. Rather, when a change of the type described in the example given above was desired, pre-defined rules for division and allocation of resources may have prevented it from being accomplished automatically. For instance, if the rules required equal allocation of available memory between two video devices having the same resolution, each device would only be entitled to 4 MB of the frame buffer. To increase the resolution of one device, therefore, the user may need to take the other device offline, or manually reconfigure its display resolution so that it can continue to be available.

The foregoing example illustrates one instance of configuration dependencies within a display system. Other types of dependencies also exist, due to the sharing of resources. For example, overlay hardware on the video card is typically used for multiple functions, namely scaling (changing the display resolution from a default value) and the display of graphics from a DVD. However, the hardware can only perform one of these functions at any given time. Typically, the DVD display is designated as the default, so that scalable resolution is not available when a DVD movie is playing, for example.

Another example pertains to the gamma correction registers. Since these registers are shared by both display devices, it is not possible to adjust their gamma correction values independently of one another. Rather, the corrections that are set for one display device will also be applied to the other. In another example, the video card's output bandwidth may be such that it cannot drive two high-resolution display devices simultaneously. As a result, one of the display devices is forced into a lower resolution and/or refresh rate.

In each of these situations, a dependency is created, where a change in one configuration parameter necessitates a change in another configuration parameter. If both changes cannot be easily accommodated within the video display system, a static, predetermined decision is implemented which may not be consistent with the desires of the user. For instance, as described previously, an increase of the resolution of one display device may require the user to remove or reconfigure the other display device. It is an objective of the present invention to provide a video display system that dynamically accommodates dependencies that may exist, for example when resources are shared among multiple components of a display system, and thereby avoid undesirable consequences when changes occur in the display system.

SUMMARY OF THE INVENTION

In accordance with the present invention, the foregoing objectives are achieved by means of a display manager that determines if a change in one configuration parameter of the display system will affect any of the other configuration parameters of the display system, i.e., whether there is a dependency. If such a dependency exists, the display manager evaluates each of the modes of operation of the display component whose settings will be affected, to identify whether it has any modes that are compatible with the changed configuration of the display system. If so, the display manager selects the configuration mode that is closest to the current mode of the affected component and provides compatibility with the changed configuration. By means of such an approach, the user continues to have access to all components, rather than having to reconfigure and/or restart the computer system due to a change which occurs in the display configuration.

In the implementation of the invention, the display manager constructs a software model of the hardware components of the display system. When a change occurs in one of the components, the display manager rebuilds the software model to reflect that change, and then determines whether valid modes of operation are available for the other components affected by the change. Preferably, the display manager is notified of a pending change in configuration before it is actually carried out. In this manner, the compatible modes of operation for the other devices can be identified and applied to their respective devices at the same time that the intended change occurs in the first device. In cases where it is not feasible to obtain advance notice of a pending change, that change can be applied to the appropriate device, and the other devices are momentarily turned off to permit the change to occur. The other devices are then automatically restarted, and the information about their functionality is employed to select the most appropriate mode of operation upon restart.

The foregoing features of the invention, as well as the advantages provided thereby, are explained in greater detail hereinafter with reference to exemplary embodiments illustrated in the accompanying drawings.

BRIEF DESCRIPTION OF THE DRAWINGS

FIG. 2 is a table of configuration modes for the first display device;

FIG. 3 is a table of configuration modes for the second display device;

FIG. 4 is an updated table of configuration modes for the first device; and

DETAILED DESCRIPTION

Figure 1:
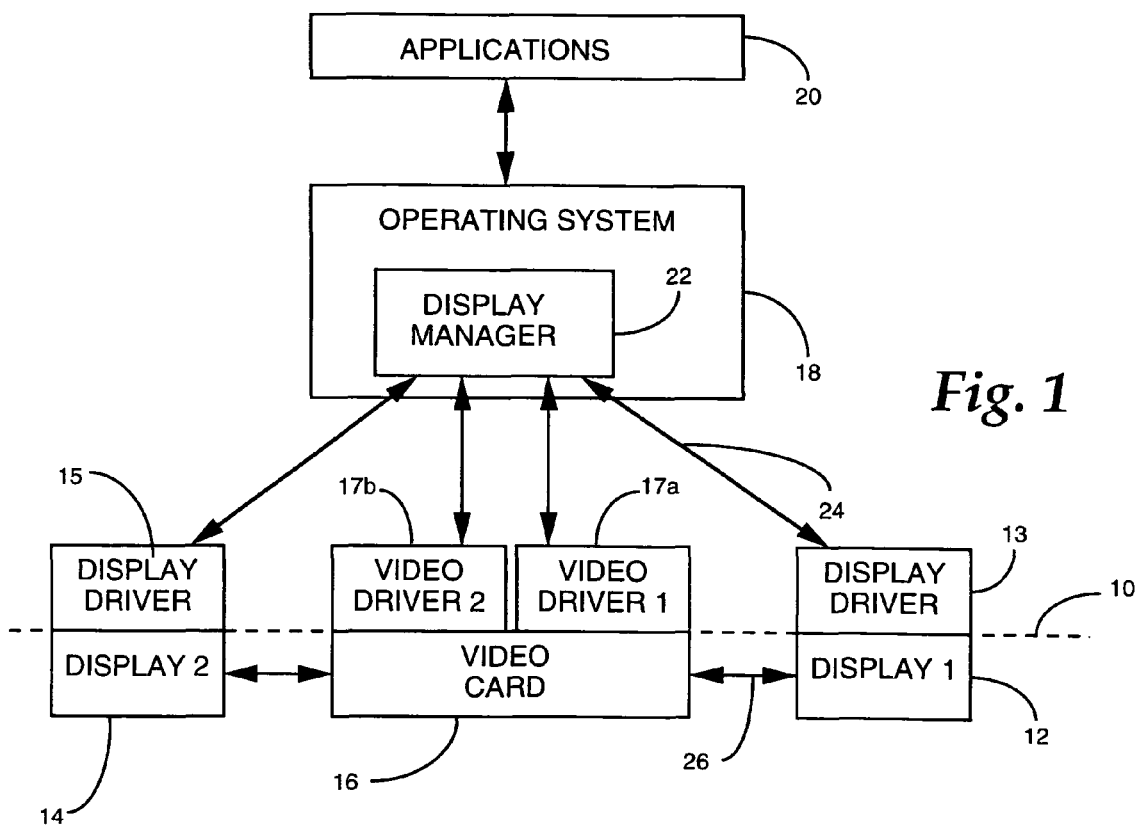
FIG. 1 is a block diagram of an overall display system architecture.

The present invention is directed to the display environment of a computer system. A block diagram of the overall architecture for a display environment is illustrated in FIG. 1. In this figure, hardware components of the computer system are illustrated below a dashed line 10, and software components are depicted above the line. These software components are stored in a suitable computer-readable medium, such as a magnetic disk, and loaded into the computer's working memory, i.e., RAM, for execution. The system can include display devices 12, 14, such as monitors, LCD screens and/or display projectors, although actual display devices need not be physically present in order for the principles of the invention to apply. An embodiment of the invention will be described with reference to a system that includes two display devices 12, 14, as illustrated. As will become evident from an understanding of the following description, however, the principles of the invention are applicable to a computer system having any number of display devices.

In the illustrated embodiment, each of the two display devices is connected to, and shares the resources of, a video card 16, which operates in accordance with video driver software 17. The card 16 has a respective video driver for each device that is connectable to it. In the illustrated example, the card 16 supports two devices, and therefore has two associated video drivers 17a and 17b. Although depicted as being a separate structure, such as a printed circuit board, the components of the video card can be incorporated with other components on a single substrate in a computer, such as its motherboard. Alternatively, the functions of the video card 16 may be provided by two or more separate cards with dependencies.

One or more software programs, such as application programs 20, generate information to be displayed on the display devices. Examples of such information include text, windows, and other graphical objects, and control structures such as menus and dialog boxes. This information is presented to the display devices through the computer's operating system 18, which also generates its own information to be presented on the display. The operating system communicates with the display devices through associated display drivers 13, 15, which comprise software components that correspond to the hardware of the respective display devices 12, 14. The operating system includes a display manager 22, which provides communication between each of the software components, and dynamically configures the display devices 12, 14.

The communication between the various software components and the hardware devices takes place via their associated drivers, e.g., the video drivers and the display drivers. Many video displays have the capability to provide information regarding their available modes of operation and/or timing specifications. Some displays, so called "smart displays", are capable of providing information about their modes of operation directly, for example in response to inquiries. For these types of displays, the display manager 22 communicates directly with the display device, through its display driver 13 or 15, by means of a communication channel 24. This communication channel can be a bus within the computer, a serial line, or any other suitable path for exchanging information between the display manager and the display drivers 13, 15 of the display devices.

The display manager also communicates with other parts of the operating system 18 and the other software programs 20 that are running on the computer. For example, in response to user input, the operating system can instruct the display manager to add a new device to a list of active displays, or remove a device therefrom. In response thereto, the display manager informs the application programs 20 of the new display configurations, to enable them to update their displayed information accordingly.

The video card 16 provides a number of resources that are shared between the two display devices 12, 14. Included among these resources are video memory which functions as a frame buffer, overlay hardware that scales pixel data for different display resolutions and provides DVD support, registers for storing gamma correction values, and clocks for driving the display timing of the devices. Some of these resources can be apportioned between the two display devices. For example, a certain amount of the video memory can be allocated to one of the display devices, and the remaining memory is available for the other display device, so that each can store its respective display data therein. Other resources, however, must be concurrently shared by both of the devices. For example, the video card may only include one set of gamma correction registers. In this case, therefore, the values which are stored in those registers are applied to both of the display devices, i.e., they cannot be corrected independently of one another. Some overlay hardware presents another type of constraint in that, while it is capable of providing both scaling of pixel data for different display resolutions and DVD display support, it can only provide such for one display device at a time. Hence, if a DVD movie is being played on one of the display devices, e.g., device 12, the overlay hardware cannot also be employed to scale the resolution of the other device, 14.

The present invention is particularly directed to the situation in which the display configuration of one of the display devices is changed, and that change necessitates a change in the configuration of the other device because of dependencies between them. For example, the display device 12 may be initially configured for a non-default resolution. For instance, if the default resolution is 1024 by 768, it might be operating with a scaled-down resolution of 800 by 600. The scaling of the pixel data to achieve this resolution is provided by scaler hardware in the video card 16. This hardware may comprise, for example, an overlay circuit, a front-end scaler or a back-end scaler. If the user then selects a DVD disk drive (not shown) in the computer system to view a movie on the other display device 14, that function precludes the use of the scaler on the first display device 12. In the past, when such a situation occurred, since the scaler hardware could not simultaneously support the playback of the DVD movie and the reduced resolution of the display device 12, that function was either not allowed or one of the two display devices was placed in an offline mode, i.e., it was effectively shut off. In the present example, since the most current instruction from the user is to view the movie on the display device 14, the device 12 would be placed in the offline mode. In this mode, the signal to the device 12 is removed, which causes the application programs to become unaware of its existence.

A similar type of situation can occur in connection with the video memory on the card. For example, the two display devices 12, 14 might be configured so that they each require 3 MB of frame buffer memory on the card. One of the two devices, e.g., device 12, could then have its resolution increased, so that it requires twice as much memory, i.e., 6 MB. If, however, the video card only contains 8 MB of total memory, both devices cannot be accommodated once the resolution of the device 12 is changed. Accordingly, the device 14 would have to be taken offline, so that device 12 can operate at the higher resolution designated by the user.

The present invention avoids the static decisions associated with the prior art approach, namely the removal of a device when it could not be accommodated as a result of a changed configuration, and provides a dynamic, more flexible alternative that enables all devices to remain operative whenever possible. In operation, the display manager 22 builds a model of the current hardware configuration, that takes into account the constraints on resources shared by the devices. An example of such a model, in a table format, is depicted in FIG. 2. This model pertains to one of the devices, e.g. display device 12. It comprises a series of columns which indicate the modes of operation that are available for that device, in order of preference. For the sake of illustration, each column contains three of the parameters that relate to the display configuration, namely resolution, timing and maximum bit depth, i.e. number of colors. In practice, any of a number of other display configuration parameters might also be included in the model.

To construct this model, the display manager 22 sends a request to the video driver 17a, requesting a list of its capabilities, i.e. video configurations that it supports. The display manager sends a similar request to the display driver 13 for the device, to obtain a list of operating modes that it supports. The display manager then compares the responses from each of the two drivers, to identify areas of overlap. The configuration that can be supported by both devices, i.e. the areas of overlap, are then listed. For instance, FIG. 2 illustrates three possible configurations, or modes. Within each mode, it is possible for the user to select from among a number of choices of bit depth. Accordingly, each mode column includes sub-columns for these choices.

Preferably, these modes are listed in an order of preference that is identified by the display driver. For instance, when the display driver 13 responds with the configurations supported by the device 12, it can identify an order of preference for them. These preferences could be set by the manufacturer of the device, in accordance with its capabilities, or designated by the user. The display manager 22 uses these preferences to arrange the overlapping modes in the table in order from those which are most recommended to those which are not as highly recommended. If desired, non-overlapping modes can also be listed, although they may not be generally useful. From this list, the user can select a given mode for the operation of the device, e.g. Mode 1, and a given bit depth, such as 32 bits per pixel. The current selection is identified by an "X" in the lowest row of the table.

At some point, the user may issue a command to change the configuration of one of the display devices. For instance, the user may desire to increase the display resolution of the first device from 1024×768 to 1920×1200, while at the same time reducing the number of colors by going from 32 bits per pixel to 16 bits per pixel, i.e. to go from Mode 1 to Mode 2 with a smaller number of colors. The original setting required approximately 3 MB of memory, whereas the new setting requires approximately 4.6 MB of frame buffer memory. The increased memory requirements of the first device at this new setting could have an impact on other devices which share the frame buffer with it. For instance, if the video card only contains 8 MB of total memory, and the second device was operating at a configuration that required 4 MB of the frame buffer, the second device cannot be accommodated at the new settings for the first device.

To identify the fact that there may be an adverse effect on resources when a video device switches from one configuration to another, the table of FIG. 2 includes a dependency bit for each of the available modes and bit depths. This bit is set to a value of one for a given setting if the change to that setting from the current setting could adversely affect the other device(s). In the present example, the switch from Mode 1 at a bit depth of 32 to Mode 2 at a bit depth of 16 requires a greater amount of frame buffer memory to be allocated to the first device. Since this reduces the amount of available memory available to other devices, the dependency bit for this setting is given a value of one. In contrast, Mode 3 has a lower resolution than Mode 1, so it would free up some of the frame buffer memory if it were selected at any of the available bit depths. In this case, there is no adverse effect upon other devices, so the dependency bits for each setting of Mode 3 have a value of zero. In a similar manner, if the user reduces the bit depth in Mode 1 from 32 to 16 or 8, that reduces the memory requirements, so the dependency bits are set to zero for these choices.

In the illustrated example, the dependency bit is set in accordance with whether a change to a new configuration would increase the memory requirements of the device. Of course, other factors can be used to determine the setting of the dependency bit as well, to take into account all of the resources that are shared among the display devices. In general, each possible configuration of the display system will have its dependency bit set to a value of one if a change to that configuration from the current configuration affects a shared resource in a manner which could have an adverse impact on another device.

When the user changes to a configuration whose dependency bit is set to a value of one, the display manager rebuilds the software model to accommodate the changed configuration of the first device. To do so, it polls the display driver for the second device, to determine the modes of operation that are available for it. In response, the second device returns values corresponding to each of its available modes of operation, in order of preference, as depicted in FIG. 3. Some of these modes may have sufficiently low memory requirements that they can be accommodated by the amount of memory that is currently available. In the illustrated example, each of Modes 2 and 3 for the second device, as well as the two lower-bit-depth configurations of Mode 1, have sufficiently low memory requirements that they can be employed.

The display manager selects one of these modes and reconfigures the second display device accordingly, so that both display devices can continue to operate. However, if any of these available modes would cause a dependency change from the current setting of the device, i.e. its dependency bit is currently set to one, it is not selected. In the example of FIG. 3, for instance, Mode 3 has its dependency bits set to one because it may require the overlay hardware to scale the pixel data to its resolution. Hence, the configurations of Mode 3 would not be selected.

When more than one configuration mode is available that would permit the second device to continue to operate, various rules can be employed to select the most appropriate choice. For example, the individual parameters can be given an order of priority, and the selection can be made on the basis of the highest priority parameter that is closest to the pre-change configuration of the display device. For instance, in the example of FIG. 3, two of the configuration modes (Mode 1 and Mode 2) can be selected. One of these modes offers a higher display resolution, whereas the other offers greater pixel depth. The selection process may attempt to preserve display resolution, at the expense of bit depth, for example. In such a case, Mode 1 at a bit depth of 16 would be selected. In a more complex approach, dependencies could be tracked on a per-device basis, and the mode which offered the fewest dependencies could be selected.

In some cases, the second device may not have any available modes of operation that can be accommodated as a result of the change in the configuration of the first device. For example, if the user desires to maintain a higher bit depth on the first device, such a setting may require substantially all of the available video memory, leaving none for the second device. In such a case, therefore, the display manager removes the second device from the system.

The setting of the dependency bits is carried out dynamically, in accordance with the currently selected configuration mode. More particularly, in the example of FIG. 2, switching from Mode 1 at a bit depth of 32 to Mode 2 at a bit depth of 16 results in a change of resource allocation, and therefore the dependency bit is set for Mode 2 at a bit depth of 16. However, once the device is operating in Mode 2 at this bit depth, a switch back to Mode 1 (or Mode 3) would not require additional memory, and hence there is no dependency. Conversely, switching to a higher bit depth of 32 in Mode 2 would require more memory, and therefore creates a dependency. Thus, once the switch is made to Mode 2 for the first device, the configuration table for that device is updated to reflect the new dependencies, as illustrated in FIG. 4.

In a preferred embodiment of the invention, the revised configurations for each of the devices is determined before the changes are applied to any of them. In this mode of operation, when the user issues a command to apply a change to a particular device, before such a change actually occurs, the display driver for that device provides a message to the display manager that a change has been requested, before actually effecting the change. In response, the display manager rebuilds the data model, for example as illustrated in FIG. 3. Once the final configuration has been determined for each of the devices, the display manager then sends a signal to the display drivers of each of those devices, to reconfigure them accordingly. In this embodiment, all of the devices remain active throughout the change in configuration.

In some cases, however, it may not be possible for the device driver to provide advance notice to the display manager that the configuration of its device is being changed. Rather, the device driver may only be able to inform the display manager that a change has occurred. In such a case, the display manager may ask the device driver to report on the changes that occurred, or may probe the video card to determine its current configuration. The display manager then turns off all dependent display devices, and determines whether they have available configuration modes that can be accommodated. If so, these configuration modes are applied, and the devices are then restarted.

As described previously, it may not be possible to maintain both display devices operational, for instance, when the configuration of one device requires all of the available video memory. In such a situation, the second device is taken offline by its driver. When this occurs, the driver informs the display manager that the device has been transferred to an invalid state as a result of a dependency. In response, the display manager can attempt to find a valid mode for the second device that does not have a dependency on the first device. For instance, if the dependency was based upon the scaler hardware, the display manager might look for a mode that does not rely upon that hardware, e.g. a default resolution.

Figure 5:
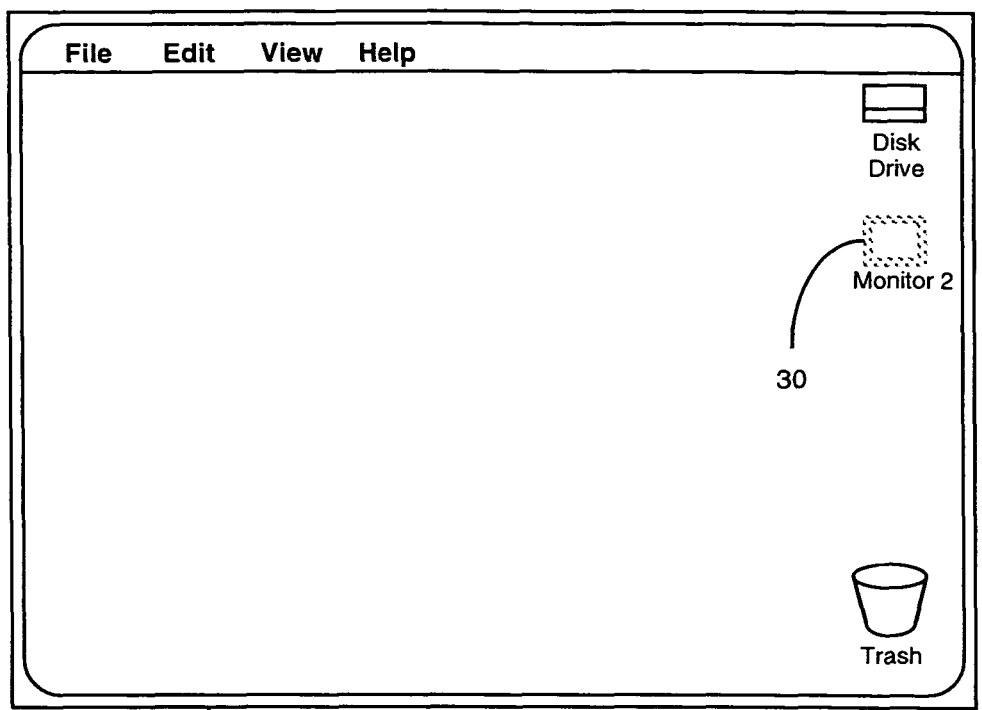
FIG. 5 is an illustration of a display containing an indicator for a device in an offline state.

If it is not possible to find a non-dependent mode of operation, then the second device remains offline, with an invalid status. In accordance with a further feature of the invention, however, the need to restart the computer in order to bring the device back online can be avoided. This is accomplished by keeping the device driver running even though a signal is no longer being applied to its associated device. In other words, when the device is taken offline, its driver is not removed from the computer's working memory. In addition, an indicator of the offline device is preferably displayed on the computer's user interface, to provide the user with a mechanism for selecting that device and bringing it back online when another change occurs that accommodates the operating modes of the device. For example, a list of offline displays could be provided as a menu item, or an icon comprising a ghost image 30 of the device can be displayed on the device which remains in operation, as shown in FIG. 5.

From the foregoing, it can be seen that the present invention provides a mechanism that accommodates the dependencies of components in a computer's video display system, and avoids static decisions which may prohibit a desired change or cause one or more of those components to be removed from the display system. Upon receiving an indication that a change has occurred, or is about to occur, the display manager examines the capabilities of the dependent components, to identify configuration modes that can be accommodated in view of the indicated change. If any such configurations are identified, the dependent components are reconfigured in accordance with the identified configuration modes, so that the dependent components can continue to be available within the video display system, and without the need to restart, and possibly manually reconfigure, the computer system.

To illustrate the principles of the invention, an example has been described in which dependencies between devices are based upon a shared resource, namely frame buffer memory to be allocated to each device. Other types of dependencies can exist as well, and be accommodated by the present invention. For instance, a display device may have two or more video input terminals. If the selection of one terminal causes the other terminal to be cut off, this results in a dependency that can be identified within a model such as the table of FIG. 2, by including the video input terminal as another element of the table.

It will be appreciated, therefore, that the present invention can be embodied in other forms without departing from the spirit or essential characteristics thereof. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for accommodating changes in the configuration of a display system configured to operate a plurality of display components contemporaneously, comprising the steps of:

generating a model of the display system to contain available configuration modes of a first one of the display components, based on a current configuration of the display system, and to contain an indication of whether a change to a current configuration mode of the first one of the display components to a different one of the available configuration modes could adversely affect a current configuration mode of a second one of the display components in the display system, wherein the first one and the second one of the display component operate concurrently and share resources for processing video;

receiving an indication that a parameter in the current configuration of the display system is being changed due to a change to the current configuration mode of the first one of the components;

detecting whether the current configuration mode of the second one of the components in the display system could be adversely affected by said change to current configuration mode of the first one of said components based on the model of the display system;

obtaining available configuration modes for the second one of the components whose current configuration mode could be adversely affected by said change to the first one of the components;

selecting one of the available configuration modes for the second one of the components that is compatible with said change to the first one of the components; and while both the first one and the second one of the display component operate concurrently, reconfiguring the operating parameters of the second one of the components to the selected mode that is compatible with the change to the current configuration mode of the first one of the components, wherein the reconfigured parameters and the change to the current configure mode transfers resources for processing video from the second one of the components to the first one of the components.

2. The method of claim 1, wherein the step of generating the model of the display system includes generating the model of the display system to identify available configuration modes for each one of the components, respectively, and indicate whether a current configuration mode of another one of the components of the display system could be adversely affected by a change to a given mode of first one of the components.

3. The method of claim 2, further including the step of dynamically updating said model for each component whose configuration mode has been changed after said change to the first one of the components occurs to reflect changes in configuration compatibilities based upon the changed configuration mode of the first one of the components.

4. The method of claim 1, wherein the step of reconfiguring the operating parameters of the second one of the components includes placing the second one of the components in an offline state if none of the available configuration modes is compatible with said change to the first one of the components.

5. The method of claim 4, further including the step of displaying an indication of the second one of the components that is in an offline state, which enables the second one of the components to be selected for return to an online state.

6. The method of claim 5, further including the step of continuing to execute a device driver for the second one of the components that is in the offline state.

7. A display system for a computer configured to operate a plurality of display devices contemporaneously, comprising:
a first display device;
a second display device, wherein the first display device and the second display device operate concurrently and share resources for processing video; and
a display manager operable to generate a model for each of said first and second display devices which identifies available configuration modes for each of said first and second devices, respectively, based on a current configuration of the display system, and which identifies whether a change to a current configuration mode of one of said first and second devices to a different one of the available configuration modes could adversely affect a current configuration mode of the other one of said first and second devices, respond to a change to the current configuration mode of the one of said devices to determine whether the current configuration mode of the other one of said devices could be adversely affected by said change to the one of said devices based on the generated model of the display system, and, if so, to select an available configuration mode for the other one of said devices that is compatible with the change to the current configuration mode of the one of said devices, and, while both the first display device and the second display device component operate concurrently, dynamically reconfigure the other one of said devices to operate according to the selected configuration mode that is compatible with the change to the current configuration mode of the one of said devices, wherein the reconfiguration and the change to the current configure mode transfers resources for processing video from the other one of said devices to the one of said devices.

8. The display system of claim 7, wherein said model includes data that indicates whether the configuration mode of the other one of said devices in the display system could be adversely affected by a change from a current configuration mode to a different configuration mode of the one of said devices.

9. The display system of claim 8, wherein said data indicates that the configuration mode of the other one of said devices could be adversely affected by said change to the current configuration mode of the one of said devices if said different mode has higher memory requirements than said current mode.

10. The display system of claim 7, wherein said display manager is operable to place the other one of said devices in an offline state if there is no available mode for the other one of said devices that is compatible with the change to the current configuration mode of the one of said devices.

11. The display system of claim 10, wherein said display manager is operable to display an indicator of the other one of said devices when the other one of said devices is placed in the offline state, to enable the other one of said devices to be selected and returned to an online state.

12. A computer processing system comprising:
a memory unit including a computer-readable recording medium having a computer program recorded thereon; and
a processing unit, by executing the computer program recorded on the computer-readable recording medium, being configured to:
generate a model for each of a plurality of display devices which identifies available configuration modes for each of said devices, respectively, based on a current configuration of the display system, and which identifies whether a change to a current configuration mode of a first one of said display devices to a different one of the available configuration modes could adversely affect a current configuration mode of a second one of said display devices, wherein the plurality of display devices operate concurrently and share resources for processing video;
respond to a change in the current configuration mode of the one of said devices to determine whether the configuration mode of the second one of said devices could be adversely affected by said change to the current configuration mode of the first one of said devices based on the generated model;
select an available configuration mode for the second one of said devices that is compatible with the change to the current configuration mode of the first one of said devices if it is determined that the current configuration mode of the second one of said devices could be adversely affected by said change to the current configuration mode of the first of said devices; and while the plurality of display devices operate concurrently, dynamically reconfigure the second one of said devices to operate according to the selected configuration mode that is compatible with the change to the current configuration mode of the first one of said devices, wherein the reconfiguration and the change to the current configure mode transfers resources for processing video from the second one of said devices to the first one of said devices.

13. The computer processing system of claim 12, wherein said model includes data that indicates whether the current configuration mode of the second one of said devices in the display system could be adversely affected by a change from a current configuration mode to a different mode of the first one of said devices.

14. The computer processing system of claim 13, wherein said data indicates that the current configuration mode of the second one of said devices could be adversely affected by said change to the current configuration mode of the first one of said devices if said different mode has higher memory requirements than said current mode.

15. The computer processing system of claim 12, wherein said processing unit is configured to place the second one of said devices in an offline state if there is no available mode for the second one of said devices that is compatible with the change to the current configuration mode of the first one of said devices.

16. A computer-readable medium having a program stored thereon that causes a computer, which is configured to operate a plurality of display components contemporaneously, to execute operations comprising:

generating a model to contain available configuration modes of a first one of the display components, based on a current configuration of a display system of the computer, and to contain an indication of whether a change to a current configuration mode of the first one of the components to a different one of the available configuration modes could adversely affect a current configuration mode of a second one of the display components in the display system, wherein the first one and the second one of the display component operate concurrently and share resources for processing video;

receiving an indication that a parameter in the current configuration of the display system of the computer is being changed due to a change to the current configuration of the first one of the components;

detecting whether the current configuration mode of the second one of the components in the display system could be adversely affected by said change to the current configuration mode of the first one of said components based on the generated model;

obtaining available configuration modes for the second one of the components whose current configuration mode could be adversely affected by said change to the first one of the components;

selecting one of the available configuration modes for the second one of the components that is compatible with said change to the first one of the components; and reconfiguring the operating parameters of the second one of the components to the selected mode, wherein the reconfigured parameters and the change to the current configure mode transfers resources for processing video from the second one of the components to the first one of the components.

17. The computer-readable medium of claim 16, wherein said program causes the computer to generate the model to identify available configuration modes for each one of the components, respectively, and indicate whether the operation of the second one of the components of the display system could be adversely affected by a change from a current configuration mode of the first one of the components to another mode.

18. The computer-readable medium of claim 17, wherein said program causes the computer to execute the further operation of dynamically updating said model for each component whose configuration mode has been changed after said change to the first one of the components occurs to reflect changes in configuration compatibilities based upon the changed mode of the first one of the components.

19. A display system for a computer configured to operate a plurality of display devices contemporaneously, comprising:

a first display device;

a second display device, wherein the first display device and the second display device operate concurrently and share resources for processing video; and a display manager operable to generate a model of the display system to identify a plurality of available configuration modes for each one of said devices, respectively, in accordance with configuration parameters of said display system, based on a current configuration of the display system, and to identify whether a change in a current configuration mode of one of said devices to a different one of the available configuration modes could adversely affect a current configuration mode of the other one of said devices, determine whether a change to the current configuration mode of the one of said devices could adversely affect the current configuration mode of the other one of said devices based on the model of the display system, dynamically update the model for each one of said devices whose current configuration mode has been adversely affected in response to the change in the current configuration mode of the one of said devices, and while both the first display device and the second display device component operate concurrently, automatically reconfigure the current configuration mode of the other one of said devices to one of the available configuration modes of the other one of said devices that is compatible with the configuration parameters of said display system according to the change in the current configuration mode of the one of said devices, when it is determined that the current configuration mode of the other one of the said devices could be adversely affected by the change in the current configuration mode of the one of said devices, wherein the reconfiguration and the change to the current configure mode transfers resources for processing video from the other one of said devices to the one of said devices.

20. The display system of claim 19, wherein said display manager is operable to generate the model to indicate whether a current configuration mode of the other one of said devices could be adversely affected by a change in a current configuration mode of the one of said devices to a different configuration mode.

21. The display system of claim 19, wherein said display manager is operable to generate the model to contain the plurality of available configuration modes for each one of said devices, parameter values associated with each mode, and a dependency value associated with each parameter value that indicates whether compatibility of the current configuration mode of another one of said devices has a dependency on a change from one parameter value to another parameter value of one of said devices, respectively.

22. The display system of claim 21, wherein said display manger is operable to dynamically update the model for each one of said devices whose configuration mode has changed in response to the change in the current configuration mode of the one of said devices, by changing dependency values associated with at least one of the parameter values affected by the change in the current configuration mode of the one of said devices.

23. The display system of claim 19, wherein said display manager is operable to reconfigure the configuration mode of the other one of said devices so that the reconfigured configuration mode enables the other one of said devices to continue to operate contemporaneously with the one of said devices after the change in the configuration mode of the one of said devices.

24. The display system of claim 19, further comprising:
a first device driver configured to operate said first display device in accordance with the configuration parameters of said display system, and notify said display manager of the plurality of available configuration modes for said first display device; and
a second device driver configured to operate said second display device in accordance with the configuration parameters of said display system, and notify said display manager of the plurality of available configuration modes for said second display device.

25. The display system of claim 24, wherein said first and second device drivers are operable to notify said display manager of a change in the configuration mode of said first and second display devices, respectively, prior to a change from a current configuration mode to a different configuration mode.

26. The display system of claim 19, wherein:
said first and second display devices are configured to be operated by a respective device driver; and
said display manager is operable to place the other one of said devices in an offline state if none of the available configuration modes of the other one of said devices is compatible with the change in the configuration mode of the one of said devices, while continuing to execute the device driver of the other one of said devices.

27. The display system of claim 19, wherein said display manager is operable to reconfigure the configuration mode of the other one of said devices without requiring the computer to be restarted.

28. The method of claim 2, wherein:
the step of generating the model of the display system includes generating the model to contain an indication, in an order of preference, which of the available configuration modes of the second one of the components is compatible with a change to the current configuration mode of the first one of the components; and
the step of selecting one of the available configuration modes of the other one of the components includes selecting a most preferred one of the available configuration modes for the second one of the components that is compatible with the change to the current configuration mode of the first one of the components, according to the preferred identification of available configuration modes of the second one of the components contained in the generated model.

29. The display system of claim 7, wherein said display manager is operable to:
generate the model to contain an indication, in an order of preference, which of the available configuration modes of the other one of the devices is compatible with a change to the current configuration mode of the one of the devices; and
select a most preferred one of the available configuration modes for the other one of the devices that is compatible with the change to the current configuration mode of the one of the devices, according to the preferred identification of available configuration modes of the other one of the devices contained in the generated model.

30. The computer processing system of claim 12, wherein said processing unit, by executing the computer program recorded on the computer-readable recording medium, is configured to:
generate the model to contain an indication, in an order of preference, which of the available configuration modes of the second one of the devices is compatible with a change to the current configuration mode of the first one of the devices; and
select a most preferred one of the available configuration modes for the second one of the components that is compatible with the change to the current configuration mode of the first one of the components, according to the preferred identification of available configuration modes of the other one of the devices contained in the generated model.

31. The computer-readable medium of claim 16, wherein said program causes the computer to perform operations comprising:
generating the model to contain an indication, in an order of preference, which of the available configuration modes of the second one of the components is compatible with a change to the current configuration mode of the first one of the components; and
selecting a most preferred one of the available configuration modes for the second one of the components that is compatible with the change to the current configuration mode of the first one of the components, according to the preferred identification of available configuration modes of the other one of the components contained in the generated model.

32. The display system of claim 19, wherein said display manager is operable to:
generate the model to contain an indication, in an order of preference, which of the available configuration modes of the other one of the device is compatible with a change to the current configuration mode of the one of the devices; and
select a most preferred one of the available configuration modes for the other one of the devices that is compatible with the change to the current configuration mode of the one of the devices, according to the preferred identification of available configuration modes of the other one of the devices contained in the generated model.

33. A method for accommodating changes in the configuration of a display system having a plurality of display components that operate contemporaneously, comprising the steps of:
generating a model of the display system that contains available configuration modes of a first one of the display components, and that contains an identifier that indicates whether a change from a current configuration mode of the first one of the components to a different one of the available modes of the first one of the components could adversely affect a current configuration mode of a second one of the components of the display system, wherein the first one and the second one of the components component operate concurrently and share resources for the processing video;

receiving an indication that the current configuration mode of the first one of the components is being changed to a different configuration mode;

determining whether the different available configuration mode of the first one of the components has an associated identifier indicating that a change to the different available mode could adversely affect the current configuration mode of the second one of the components of the display system;

if the determination is affirmative, obtaining available configuration modes for the second one of the components of the display system;

selecting an available configuration mode for the second one of the components that is compatible with the change to the current configuration mode of the first one of the components; and while both the first one and the second one of the components operate concurrently, reconfiguring the operating parameters of the second one of the components to the selected mode that is compatible with the change to the current configuration mode of the first one of the components, wherein the reconfigured parameters and the change to the current configure mode transfers resources for processing video from the second one of the components to the first one of the components.

34. The method of claim 33, wherein the model of the display system includes available configuration modes for each one of the components and for each component, an identifier that indicates whether a change from the current configuration mode of that component to each of the other available modes of that component could adversely affect a current configuration mode of another component of the display system.

35. The method of claim 34, further including the step of dynamically updating the identifiers in said model based upon the changed configuration mode of the one component, respectively.

36. A display system for a computer configured to operate a plurality of display devices contemporaneously, comprising:

a first display device;

a second display device, wherein the first display device and the second display device operate concurrently and share resources for processing video; and a display manager configured to:

(a) generate a model for each of said first and second display devices which identifies available configuration modes for each of said first and second devices, and which contains an identifier that indicates whether a change to a current configuration mode of one of the display devices to a different one of the another available modes of the one of the display devices could adversely affect a current configuration mode of the other one of the display devices, (b) respond to a change from the current configuration mode of the one of said devices to a new configuration mode, and determine whether the new configuration mode of the one of said devices has an associated identifier indicating that a change to the new mode could adversely affect the current configuration mode of the other one of the display devices, and, if so, (c) select an available configuration mode for the other one of the display devices that is compatible with the change to the current configuration mode of the one of the display devices, and (d) while both the first display device and the second display device component operate concurrently, dynamically reconfigure the other one of the display devices to operate according to the selected configuration mode that is compatible with the change to the current configuration mode of the one of the display devices, wherein the reconfiguration and the change to the current configure mode transfers resources for processing video from the other one of said devices to the one of said devices.

37. A computer-readable medium having a program stored thereon that causes a computer, which is configured to operate a plurality of display components contemporaneously, to execute the following operations:

generate a model that contains available configuration modes of one of the display components, and that contains an identifier that indicates whether a change from a current configuration mode of the one component to a different one of the available modes of the one component could adversely affect a current configuration mode of another component of the display system, wherein the one of the display components and the other component operate concurrently and share resources for processing video;

in response to an indication that the current configuration mode of the one component is being changed to a different configuration mode, determine whether the different available configuration mode of the one component has an associated identifier indicating that a change to the different available mode could adversely affect the current configuration mode of another component of the display system;

if the determination is affirmative, obtain available configuration modes for another one of the components of the display system;

select an available configuration mode for the other one of the components that is compatible with the change to current configuration mode of the one component; and while the one of the display components and the other component operate concurrently, reconfigure the operating parameters of the other component to the selected mode that is compatible with the change to current configuration mode of the one component, wherein the reconfiguration and the change to the current configure mode transfers resources for processing video from the one of the display components to the other component.

* * * * *

UNITED STATES PATENT AND TRADEMARK OFFICE
CERTIFICATE OF CORRECTION

PATENT NO. : 8,453,063 B1
APPLICATION NO. : 10/835457
DATED : May 28, 2013
INVENTOR(S) : Ian Hendry et al.

It is certified that error appears in the above-identified patent and that said Letters Patent is hereby corrected as shown below:

In the Claims

In Column 15, Line 3-4, In Claim 33, delete "components" and insert -- display --, therefor.

Signed and Sealed this
Twentieth Day of August, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,453,063 B1 | Page 1 of 1 |
| APPLICATION NO. | : 10/835457 | |
| DATED | : May 28, 2013 | |
| INVENTOR(S) | : Ian Hendry et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1176 days.

Signed and Sealed this
Thirtieth Day of December, 2014

Michelle K. Lee
*Deputy Director of the United States Patent and Trademark Office*